(12) United States Patent
Lim (10) Patent No.: US 8,565,336 B2
(45) Date of Patent: Oct. 22, 2013

(54) DATA TRANSMISSION APPARATUS AND METHOD, AND DATA RECONSTITUTION APPARATUS AND METHOD

(75) Inventor: Jong Soo Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 9 days.

(21) Appl. No.: 13/356,226

(22) Filed: Jan. 23, 2012

(65) Prior Publication Data

US 2012/0201331 A1    Aug. 9, 2012

(30) Foreign Application Priority Data

Feb. 8, 2011  (KR) .................. 10-2011-0011267
May 18, 2011  (KR) .................. 10-2011-0046741

(51) Int. Cl.
 *H04L 27/10* (2006.01)
(52) U.S. Cl.
 USPC ........... 375/284; 375/260; 375/285; 375/297; 375/325; 375/349

(58) Field of Classification Search
 USPC ............... 375/259–261, 263–271, 279–285, 375/295–300, 302, 308, 316, 320, 322, 375/324–333, 340, 342, 346–351
 See application file for complete search history.

(56) References Cited

U.S. PATENT DOCUMENTS

| | | | | |
|---|---|---|---|---|
| 2005/0254596 | A1* | 11/2005 | Naguib | 375/299 |
| 2005/0281290 | A1* | 12/2005 | Khandekar et al. | 370/500 |
| 2006/0274641 | A1* | 12/2006 | Grieco et al. | 370/210 |
| 2008/0107158 | A1  | 5/2008  | Yoshii et al. | |

* cited by examiner

*Primary Examiner* — Sam K Ahn
*Assistant Examiner* — James M Perez (57) ABSTRACT

Disclosed are data transmission/reception apparatus and method that may be applied to a case where additional data is to be transmitted in a CE-OFDM modulation/demodulation scheme that satisfies an OFDM feature which is robust against multipath fading and simultaneously has a feature that amplitude is constant. Service channel information, modulation parameter information of a physical layer, and the like, may be transmitted by using an additionally secured information channel. If using this, a service search time may be saved, and power of a receiver may be reduced.

17 Claims, 6 Drawing Sheets

FIG. 7

DATA TRANSMISSION APPARATUS AND METHOD, AND DATA RECONSTITUTION APPARATUS AND METHOD

CROSS-REFERENCE TO RELATED APPLICATIONS

This application claims priority to and the benefit of Korean Patent Application No. 10-2011-0011267 and 10-2011-0046741 filed in the Korean Intellectual Property Office on Feb. 8, 2011, and May 18, 2011, the entire contents of which are incorporated herein by reference.

TECHNICAL FIELD

The present invention relates to data transmission apparatus and method having a data modulation function. In particular, the present invention relates to data transmission and method capable of inserting additional data upon data modulation. Also, the present invention relates to data reconstitution apparatus and method having a data demodulation function. In particular, the present invention relates to data reconstitution apparatus and method for separating and reconstituting data.

BACKGROUND ART

Orthogonal Frequency Division Multiplexing (OFDM) is a transmission scheme that has been widely used in recent wireless communications because the OFDM is robust against multipath fading even though the OFDM uses a simple equalizer. An OFDM scheme has been adopted and used in a variety of wireless communication systems, such as a Wireless Local Access Network (WLAN), a Wireless Metropolitan Area Network (WMAN), a Digital Audio Broadcasting (DAB), a Digital Video Broadcasting (DVB), and the like.

However, an OFDM signal generally has a very high Peak-to-Average Power Ratio (PAPR) at a transmitting end. As such, if the PAPR increases, nonlinear distortion is caused by a power amplifier (PA) of a transmitter. An OFDM signal is very sensitive to the nonlinear distortion during operations. At this time, if power is not sufficiently backed off from a peak, a frequency spectrum of a communication system is widened and distortion is caused by inter-frequency modulation. As a result, the performance of the communication system is degraded.

SUMMARY OF THE INVENTION

The present invention has been made in an effort to provide data transmission apparatus and method for inserting additional data using the feature that a DC component among Constant Envelope (CE)-OFDM signal spectrum components has the largest amount of energy.

The present invention has been made in an effort to provide data reconstitution apparatus and method for separating inserted additional data and demodulating the respective separated data.

An exemplary embodiment of the present invention provides a data transmission apparatus for inserting additional data upon data modulation, including: a first data modulating unit comprising a first symbol mapping unit configured to symbol-map first input data, wherein the first data modulating unit is configured to generate first modulated data by digital-modulating the first input data in accordance with a multi-carrier modulation scheme; a second symbol mapping unit configured to generate second mapping data by symbol-mapping second input data inserted after the input of the first input data; a second data modulating unit configured to combine the first modulated data with the second mapping data and generate second modulated data by digital-modulating the combined data again in accordance with a predefined modulation scheme; and a data transmitting unit configured to transmit the second modulated data to the exterior.

When the second data modulating unit combines the first modulated data with the second mapping data, the second data modulating unit may insert phase information of symbols related to the second mapping data to a DC component of a signal containing the first modulated data.

When the second data modulating unit combines the first modulated data with the second mapping data, the second modulating unit may use any one of a first combination, which adds a phase value of the first modulated data and a phase value of the second mapping data, a second combination, which subtracts the phase value of the second mapping data from the phase value of the first modulated data, and a third combination, which subtracts the phase value of the first modulated data from the phase value of the second mapping data.

The second data modulating unit may use a modulation scheme different from the multi-carrier modulation scheme as the predefined modulation scheme.

The second symbol mapping unit may perform a symbol mapping of the second input data by phase-modulating the second input data.

The data transmission apparatus may be implemented with a Constant Envelope-Orthogonal Frequency Division Multiplexing (CE-OFDM) transmitter.

The first data modulating unit may include: a parallel data converting unit configured to convert the first input data, which is serially input, into parallel data; a first symbol mapping unit configured to generate first mapping data by symbol-mapping the parallel data; and an Inverse Fourier transform (IFT) unit configured to generate the first modulated data by IFT-processing the first mapping data.

Another exemplary embodiment of the present invention provides a data transmission method for inserting additional data upon data modulation, including: a first data modulating step comprising a first symbol mapping step for symbol-mapping first input data, wherein the first data modulating step generates first modulated data by digital-modulating the first input data in accordance with a multi-carrier modulation scheme; a second symbol mapping step for generating second mapping data by symbol-mapping second input data inserted after the input of the first input data; a second data modulating step for combining the first modulated data with the second mapping data and generating second modulated data by digital-modulating the combined data again in accordance with a predefined modulation scheme; and a data transmitting step for transmitting the second modulated data to the exterior.

When the first modulated data is combined with the second mapping data in the second data modulating step, phase information of symbols related to the second mapping data may be inserted into a DC component of a signal containing the first modulated data.

When the first modulated data is combined with the second mapping data, the second modulating step may use any one of a first combination, which adds a phase value of the first modulated data and a phase value of the second mapping data, a second combination, which subtracts the phase value of the second mapping data from the phase value of the first modulated data, and a third combination, which subtracts the phase value of the first modulated data from the phase value of the second mapping data.

The second data modulating step may use a modulation scheme different from the multi-carrier modulation scheme as the predefined modulation scheme.

The second symbol mapping step may perform a symbol mapping of the second input data by phase-modulating the second input data.

The first data modulating step may include: a parallel data converting step for converting the first input data, which is serially input, into parallel data; a first symbol mapping step for generating first mapping data by symbol-mapping the parallel data; and an Inverse Fourier transform (IFT) step for generating the first modulated data by IFT-processing the first mapping data.

Yet another exemplary embodiment of the present invention provides a data reconstitution apparatus, including: a demodulating unit configured to extract second data from combined data in which first data is combined with the second data, primarily digital-demodulate the extracted second data in accordance with a predefined first demodulation scheme, and secondarily digital-demodulate the combined data, from which the second data is extracted, in accordance with a predefined second demodulation scheme; a second data reconstituting unit configured to reconstitute the second data by symbol-demapping the digital-demodulated second data; and a first data reconstituting unit configured to reconstitute the first data by digital-demodulate the digital-demodulated combined data again in accordance with a multi-carrier demodulation scheme.

The data demodulating unit may perform a digital demodulation in accordance with the first demodulation scheme, based on phase information of symbols inserted into a DC component of a signal containing the combined data.

The data demodulating unit may use first combined data obtained by subtracting a phase value of the second data, or second combined data obtained by adding the phase value of the second data as the combined data from which the second data is extracted, when the digital demodulation is performed in accordance with the second demodulation scheme.

The data demodulating unit may use a demodulation scheme different from the multi-carrier demodulation scheme as the first demodulation scheme or the second demodulation scheme.

The data reconstitution apparatus may be implemented with a Constant Envelope-Orthogonal Frequency Division Multiplexing (CE-OFDM) receiver.

The data reconstitution apparatus may further comprising: a data receiving unit configured to interwork with a data transmission apparatus combining the first data with the second data upon secondary data modulation and receive the combined data from the data transmission apparatus. The data transmission apparatus may include: a first data modulating unit comprising a first symbol mapping unit configured to symbol-map the first input data, wherein the first data modulating unit is configured to generate first modulated data by digital-modulating the first input data in accordance with a multi-carrier modulation scheme; a second symbol mapping unit configured to generate second mapping data by symbol-mapping the second input data inserted after the input of the first input data; a second data modulating unit configured to combine the first modulated data with the second mapping data and generate second modulated data by digital-modulating the combined data again in accordance with a modulation scheme different from the multi-carrier modulation scheme; and a data transmitting unit configured to transmit the second modulated data to the data reconstitution apparatus.

The data reconstitution apparatus may further include a parallel data converting unit configured to convert the digital-demodulated combined data, which is serially input, into parallel data. The first data reconstituting unit may include: a Fourier transform (FT) unit configured to FT-process the parallel data and generate FT-processed data; a symbol demapping unit configured to generate symbol demapping data by symbol-demapping the FT-processed data; and a serial data converting unit configured to reconstitute the first data by converting the symbol demapping data into serial data.

Still another exemplary embodiment of the present invention provides a data reconstitution method, including: a data demodulating step for extracting second data from combined data in which first data is combined with the second data, primarily digital-demodulating the extracted second data in accordance with a predefined first demodulation scheme, and secondarily digital-demodulating the combined data, from which the second data is extracted, in accordance with a predefined second demodulation scheme; a second data reconstituting step for reconstituting the second data by symbol-demapping the digital-demodulated second data; and a first data reconstituting step for reconstituting the first data by digital-demodulating the digital-demodulated combined data again in accordance with a multi-carrier demodulation scheme.

The data demodulating step may perform a digital demodulation in accordance with the first demodulation scheme, based on phase information of symbols inserted into a DC component of a signal containing the combined data. Alternatively, the data demodulating step may use first combined data obtained by subtracting a phase value of the second data, or second combined data obtained by adding the phase value of the second data, as the combined data from which the second data is extracted, when the digital demodulation is performed in accordance with the second demodulation scheme.

The data demodulating step may use a demodulation scheme different from the multi-carrier demodulation scheme as the first demodulation scheme or the second demodulation scheme.

The data reconstitution method may further include: a data receiving step for interworking with a data transmission apparatus combining the first data with the second data upon secondary data modulation, and receiving the combined data from the data transmission apparatus.

The data reconstitution method may further include a parallel data converting step for converting the digital-demodulated combined data, which is serially input, into parallel data. The first data reconstituting step may include: a Fourier transform (FT) step for FT-processing the parallel data and generating FT-processed data; a symbol demapping step for generating symbol demapping data by symbol-demapping the FT-processed data; and a serial data converting step for reconstituting the first data by converting the symbol demapping data into serial data.

Exemplary embodiments of the present invention provide the data transmission/reception apparatus that may be applied to a case where additional data is to be transmitted in a CE-OFDM modulation/demodulation scheme that satisfies an OFDM feature which is robust against multipath fading and simultaneously has a feature that amplitude is constant. Exemplary embodiments of the present invention may obtain the following effects. First, it is possible to transmit service channel information, modulation parameter information of a physical layer, and the like, at the same time by using an additionally secured information channel. Second, a service search time may be saved, and power of a transmitter and a receiver may be reduced.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

Figure 1:
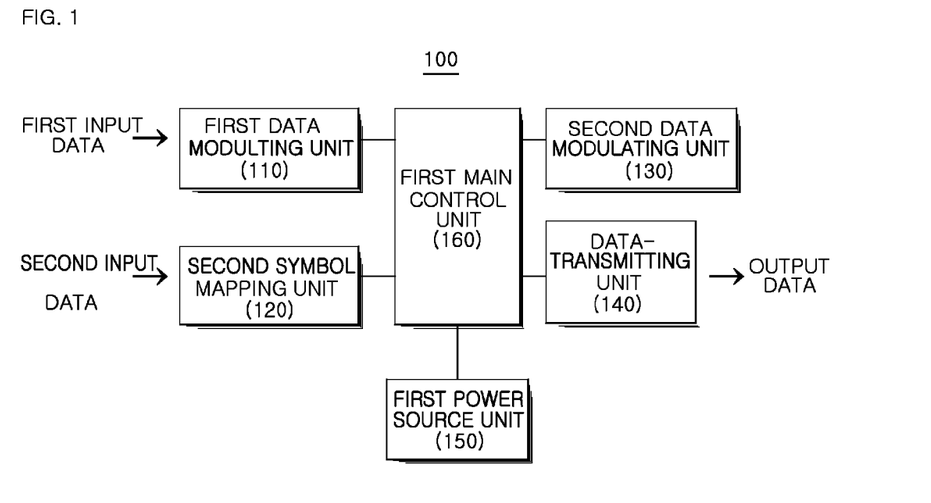
FIG. 1 is a block diagram schematically illustrating a data transmission apparatus according to an exemplary embodiment of the present invention.
Figure 6A:
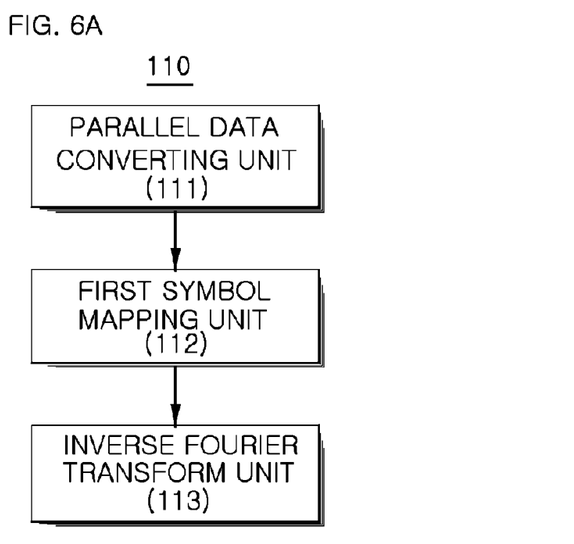
FIG. 6A is a detailed block diagram illustrating internal configurations of the data transmission apparatus according to an exemplary embodiment of the present invention.

FIG. 1 is a block diagram schematically illustrating a data transmission apparatus according to an exemplary embodiment of the present invention. FIG. 6A is a detailed block diagram illustrating an internal configuration of the data transmission apparatus according to the exemplary embodiment of the present invention.

Referring to FIG. 1, the data transmission apparatus 100 is capable of inserting data upon data modulation, and includes a first data modulating unit 110, a second symbol mapping unit 120, a second data modulating unit 130, a data transmitting unit 140, a first power source unit 150, and a first main control unit 160.

In this embodiment, the data transmission apparatus 100 may be implemented with a CE-OFDM transmitter. Considering this point, the data transmission apparatus 100 may be defined as a transmission apparatus that shifts a phase of a DC component and transmits information to the shifted phase of the DC component, by using a feature that the DC component among CE-OFDM signal spectrum components has the largest amount of energy. The data transmission apparatus 100 may reduce a PAPR to 0 dB by using a CE-OFDM modulation scheme. This is because the CE-OFDM satisfies an OFDM feature that is robust against multipath fading and simultaneously has a feature that amplitude is constant.

The first data modulating unit 110 functions to digital-modulate first input data in accordance with a multi-carrier modulation scheme and generate first modulated data. The first data modulating unit 110 uses an OFDM modulation as the multi-carrier modulation scheme.

As illustrated in FIG. 6A, the first data modulating unit 110 may include a parallel data converting unit 111, a first symbol mapping unit 112, and an Inverse Fourier Transform (IFT) unit 113. The parallel data converting unit 111 functions to convert first input data, which is serially input, into parallel data. The first symbol mapping unit 112 symbol-maps the first input data. More specifically, the first symbol mapping unit 112 functions to generate first mapping data by symbol-mapping the parallel data. The IFT unit 113 functions to generate first modulated data by IFT-processing the first mapping data.

The second symbol mapping unit 120 functions to generate second mapping data by symbol-mapping second input data inserted after the input of the first input data. The second input data is data that is additionally input after the first input data is input to the data transmission apparatus 100. Examples of the second input data include service channel information, modulation parameter information of a physical layer, and the like.

The second symbol mapping unit 120 functions to symbol-map the second input data by phase-modulating the second input data. When the first symbol mapping unit 112 symbol-maps the first input data, the first symbol mapping unit 112 may use a Quadrature Phase Shift Keying (QPSK) scheme, a 16-ary Quadrature Amplitude Modulation (16QAM) scheme, a 64QAM scheme, and the like. At this time, the first symbol mapping unit 112 may mainly use an Amplitude Modulation scheme to symbol-map the first input data. On the other hand, when the second symbol mapping unit 120 symbol-maps the second input data, the second symbol mapping unit 120 may use a Binary Phase Shift Keying (BPSK) scheme, a Differential BPSK (DBPSK) scheme, a QPSK scheme, a Differential QPSK (DQPSK) scheme, an 8-ary PSK (8PSK) scheme, and the like. The second symbol mapping unit 120 may symbol-map the second input data by using only a phase modulation scheme; however, the present invention is not limited thereto.

The second data modulating unit 130 functions to combine the first modulated data with the second mapping data, digital-modulate the combined data again in accordance with a predefined modulation scheme, and generate second modulated data. In this embodiment, the second data modulating unit 130 uses a modulation scheme different from a multi-carrier modulation scheme as the predefined modulation scheme. Preferably, the second data modulating unit 130 uses an angle modulation as the modulation scheme different from the multi-carrier modulation scheme. The second data modulating unit 130 may use a phase modulation, an amplitude modulation, and a combination of the phase modulation and the amplitude modulation.

Digital modulations are classified into four types: a multi-level modulation, a narrow-band modulation, a multi-carrier modulation, and a spread spectrum modulation. Examples of the multi-level modulation include a PSK modulation as a phase modulation, a Pulse Amplitude Modulation (PAM) as an amplitude modulation, a Quadrature Amplitude Modulation (QAM) as a combination of the phase modulation and the amplitude modulation, a Vestigial Side Band (VSB) modulation, and the like. Example of the narrow-band modulation include a π/4 QPSK modulation restricting a band of PSK, a Gaussian-filtered Minimum Shift Keying (GMSK) modulation limiting a band of MSK, and the like. The multi-carrier modulation scheme divides a carrier into more than several hundreds of subcarriers and multiplexes data over the subcarriers. An OFDM is a representative example of the multi-carrier modulation scheme. The spread spectrum modulation scheme is classified into a Spread Spectrum-Direct Sequence (SS-DS) scheme and a Spread Spectrum-Frequency Hopping (SS-FH) scheme. Considering the types of the digital modulations, the modulation scheme different from the multi-carrier modulation scheme may be defined as the multi-level modulation, the narrow-band modulation, the spread spectrum modulation, and the like.

When the second data modulating unit 130 combines the first modulated data with the second mapping data, the second data modulating unit 130 inserts phase information of symbols, which are related to the second mapping data, into a DC component of a signal containing the first modulated data.

When the second data modulating unit 130 combines the first modulated data with the second mapping data, the second modulating unit 130 uses any one of a first combination, which adds a phase value of the first modulated data and a phase value of the second mapping data, a second combination, which subtracts the phase value of the second mapping data from the phase value of the first modulated data, and a third combination, which subtracts the phase value of the first modulated data from the phase value of the second mapping data.

The data transmitting unit 140 functions to transmit the second modulated data to the exterior. Preferably, the data transmitting unit 140 transmits the second modulated data toward a target object. When the data transmission apparatus 100 is a CE-OFDM transmitter, the target object may be a CE-OFDM receiver.

The first power source unit 150 functions to supply power to the respective units constituting the data transmission apparatus 100.

The first main control unit 160 functions to control the overall operations of the respective units constituting the data transmission apparatus 100.

Figure 2:
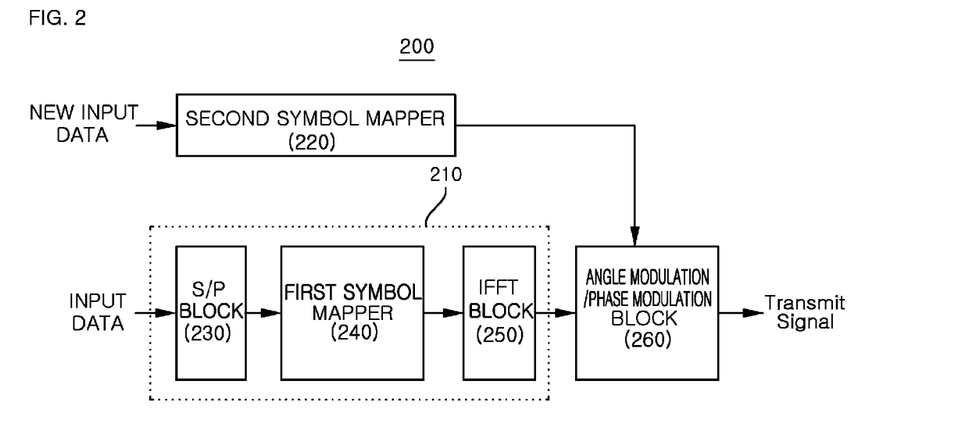
FIG. 2 is an exemplary diagram of a data transmission apparatus according to an exemplary embodiment of the present invention.
Figure 3A:
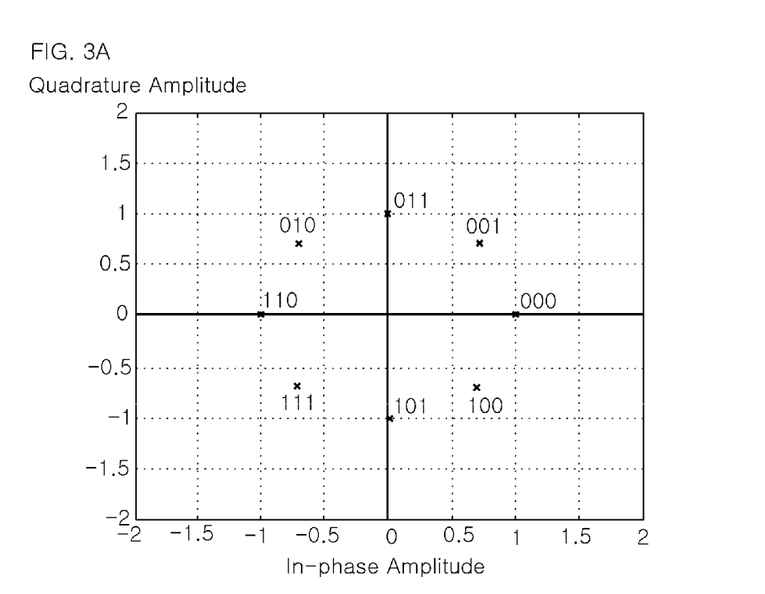
FIG. 3A and FIG. 3B are a reference diagram explaining the operation of the data transmission apparatus according to the exemplary embodiment of the present invention.
Figure 3B:
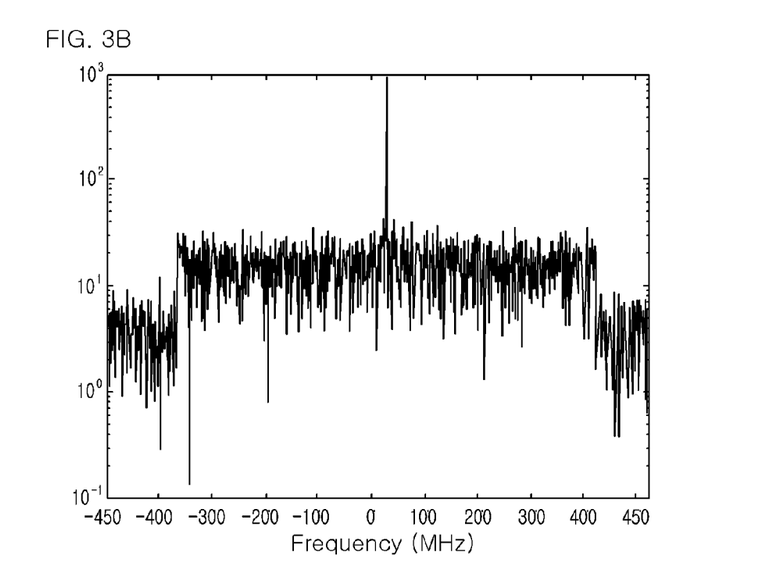

The data transmission apparatus 100 is a transmission apparatus that is capable of inserting additional data in a transmission scheme in which an OFDM modulation and an angle modulation are combined. Hereinafter, an exemplary embodiment of the data transmission apparatus 100 will be described. FIG. 2 is an exemplary diagram of a data transmission apparatus according to an exemplary embodiment of the present invention. FIG. 3A and FIG. 3B is a reference diagram explaining the operation of the data transmission apparatus according to the exemplary embodiment of the present invention.

A CE-OFDM transmitter 200 of FIG. 2 is an exemplary embodiment of the data transmission apparatus 100 of FIG. 1. The CE-OFDM transmitter 200 is a transmission apparatus that is capable of reducing a PAPR to 0 dB through a combination of an OFDM modulation scheme and an angle modulation scheme. In this embodiment, the modulation scheme in which the OFDM modulation and the angle modulation scheme are combined is defined as a CE-OFDM. The CE-OFDM satisfies an OFDM feature that is robust against multipath fading and simultaneously has a feature that amplitude is constant. The CE-OFDM has a feature that a DC component among signal spectrum components has the largest amount of energy. An object of the present invention is to transmit additional information to a phase of the DC component by using the fact that energy is concentrated on the DC component. Accordingly, the CE-OFDM transmitter 200, which will be described below, may be defined as a transmission apparatus that shifts the phase of the DC component in accordance with the CE-OFDM scheme and transmits information to the shifted phase.

The input data is data loaded on an input signal for CE-OFDM and is input bit type data. When the input data is serially inputted, a serial-to-parallel (S/P) block 230 converts the serial data into parallel data. The S/P block 230 is provided for S/P conversion. The S/P block 230 is configured to perform the function of the parallel data converting unit 111 of FIG. 6A. A first symbol mapper 240 generates symbol data from the parallel data by using a QPSK scheme, a 16QAM scheme, a 64QAM scheme, and the like. The first symbol mapper 240 is configured to perform the function of the first symbol mapping unit 112 of FIG. 6A. An Inverse Fast Fourier Transform (IFFT) block 250 performs an IFFT so as to transmit an OFDM signal in a time domain. The IFFT block 250 is configured to perform the function of the IFT unit 113 of FIG. 6A. In FIG. 2, the S/P block 230, the first symbol mapper 240, and the IFFT block 250 constitute an OFDM modulating unit 210. In this case, the OFDM modulating unit 210 is configured to perform the function of the first data modulating unit 110 of FIG. 1. An angle modulation/phase modulation block 260 functions to angle-modulate the IFFT-processed signal. The angle modulation/phase modulation block 260 is configured to perform the function of the second data modulating unit 130 of FIG. 1.

A second symbol mapper 220 symbol-maps new input data in accordance with a BPSK, a DBPSK, a QPSK, a DQPSK, an 8PSK, or the like. The second symbol mapper 220 is configured to perform the function of the second symbol mapping unit 120 of FIG. 1. The second symbol mapper 220 intending to transmit additional data uses a variety of phase modulations, such as a BPSK, a DBPSK, a QPSK, a DQPSK, an 8PSK, or the like. For example, when the second symbol mapper 220 is an 8PSK symbol mapper, the signals may be shown in FIG. 3A. In FIG. 3A, when it is assumed that input information bit is 001, a signal having passed through the second symbol mapper 220 is $$\frac{1}{\sqrt{2}} + j * \frac{1}{\sqrt{2}}$$

and has a phase of 45 degrees. Thereafter, the angle modulation/phase modulation block 260 inserts phase information of a symbol mapped to a DC component, combines the phase information with the angle-modulated signal (i.e., the signal obtained by angle-modulating the IFFT-processed signal), and transmits the combined signal.

The angle modulation/phase modulation block 260 angle-modulates an IFFT output signal of OFDM. That is, when it is assumed that the IFFT output signal is $X_1, X_2, \ldots, X_n$, an angle-modulated signal $\theta(k)$ of a kth IFFT signal is expressed as Equation 1 below. At this time, n is an IFFT size.

$$\theta(k)=\cos(X_k)+j*\sin(X_k) \quad \text{[Equation 1]}$$

The spectrum of the signal obtained by angle-modulating the IFFT signal is illustrated in FIG. 3B, and a DC component has high energy. At this time, a newly generated phase θ(new) of the symbol mapper is added to or subtracted from the angle-modulated signal (θ(1), θ(2), θ(3), ..., θ(n)), or the angle-modulated signals (θ(1), θ(2), θ(3), ..., θ(n)) is added to or subtracted from the newly generated phase θ(new) of the symbol mapper. That is, ① θ(new)+[θ(1), θ(2), θ(3), ..., θ(n)], ② θ(new)−[θ(1), θ(2), θ(3), ..., θ(n)], ③ [θ(1), θ(2), θ(3), ..., θ(n)]+θ (new), ④ [θ(1), θ(2), θ(3), ..., θ(n)]−θ (new). The data transmitting unit selects one of the four cases and transmits the selected one. θ(new) is generated in each OFDM symbol, and the phase of the DC component is shifted by θ(new) in each OFDM symbol.

Figure 4:
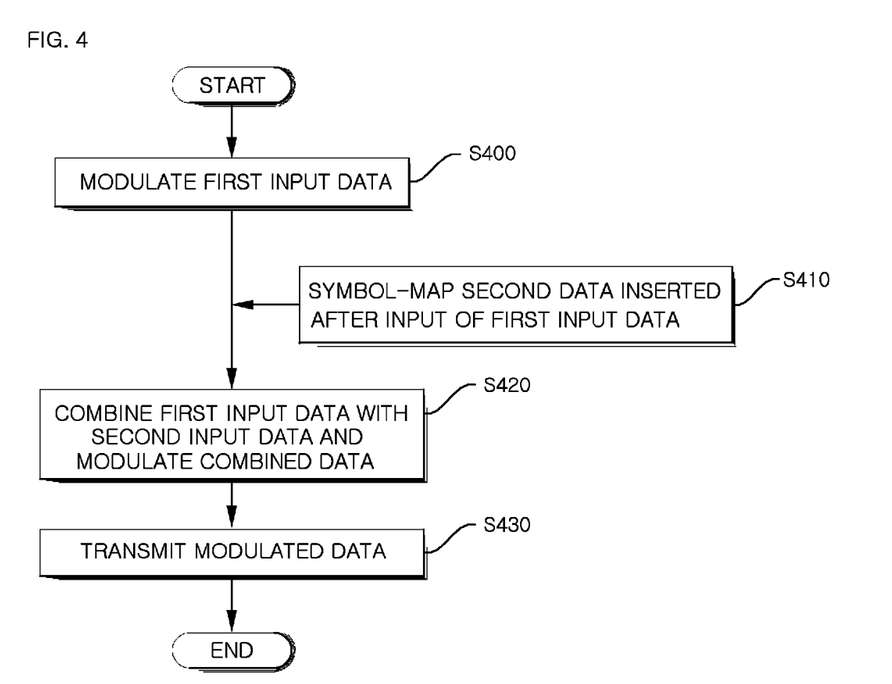
FIG. 4 is a flowchart schematically illustrating a data transmission method according to an exemplary embodiment of the present invention.

Next, a data transmission method of the data transmission apparatus 100 will be described. FIG. 4 is a flowchart schematically illustrating a data transmission method according to an exemplary embodiment of the present invention.

First, first modulated data is generated by digital-modulating first input data in accordance with a multi-carrier modulation scheme (a first data modulating step (S400)). The first data modulating step (S400) may include a parallel data converting step, a first symbol mapping step, and an IFT step. In the parallel data converting step, the first input data, which is serially input, is converted into parallel data. In the first symbol mapping step, the first input data is symbol-mapped. More specifically, first mapping data is generated by symbol-mapping the parallel data. In the IFT step, the first modulated data is generated by IFT-processing the first mapping data.

After the first data modulating step (S400), second mapping data is generated by symbol-mapping second input data inserted after the input of the first input data (a second symbol mapping step (S410)). In the second symbol mapping step (S410), the symbol mapping of the second input data is performed by phase-modulating the second input data.

After the second symbol mapping step (S410), the first modulated data is combined with the second mapping data, and second modulated data is generated by digital-modulating the combined data in accordance with a predefined modulation scheme (a second data modulating step (S420)). In the second data modulating step (S420), a modulation scheme different from a multi-carrier modulation scheme is used as the predefined modulation scheme. Preferably, an angle modulation is used. In the second data modulating step (S420), when the first modulated data is combined with the second mapping data, phase information of symbols related to the second mapping data is inserted into a DC component of a signal containing the first modulated data. When the first modulated data is combined with the second mapping data, the second data modulating step (S420) uses any one of a first combination, which adds a phase value of the first modulated data and a phase value of the second mapping data, a second combination, which subtracts the phase value of the second mapping data from the phase value of the first modulated data, and a third combination, which subtracts the phase value of the first modulated data from the phase value of the second mapping data.

After the second data modulating step (S420), the second modulated data is transmitted to the exterior (a data transmitting step (S430)).

Figure 5:
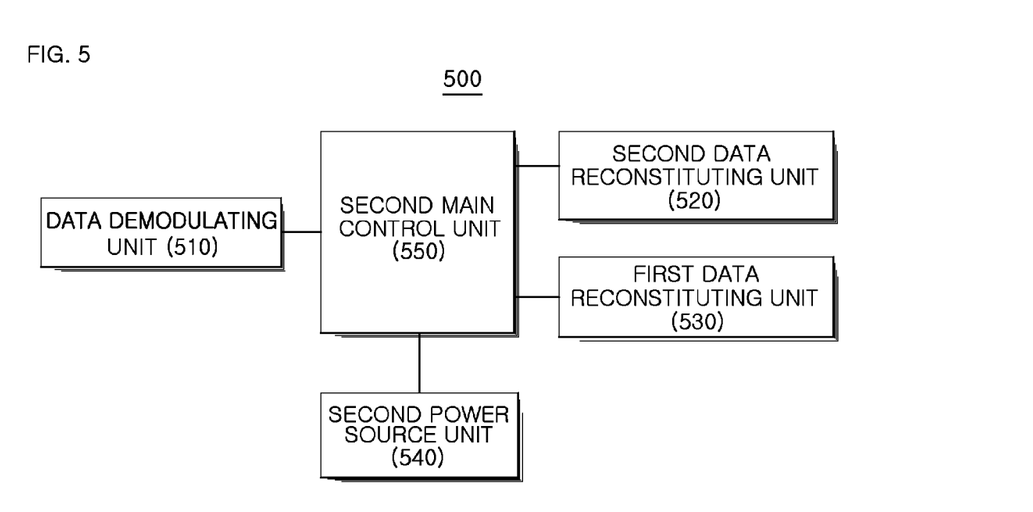
FIG. 5 is a block diagram schematically illustrating a data reconstitution apparatus according to an exemplary embodiment of the present invention.
Figure 6B:
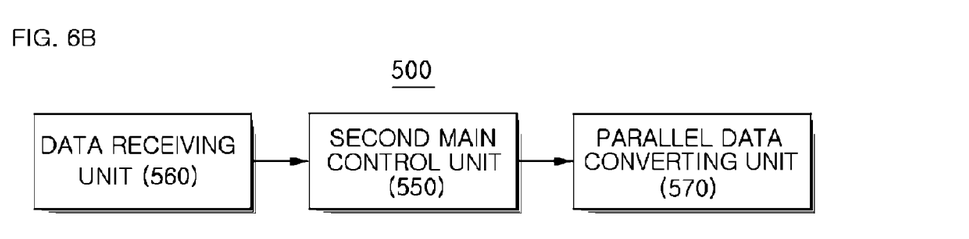
FIG. 6B and FIG. 6C are a detailed block diagram illustrating internal configurations of the data reconstitution apparatus according to an exemplary embodiment of the present invention.
Figure 6C:
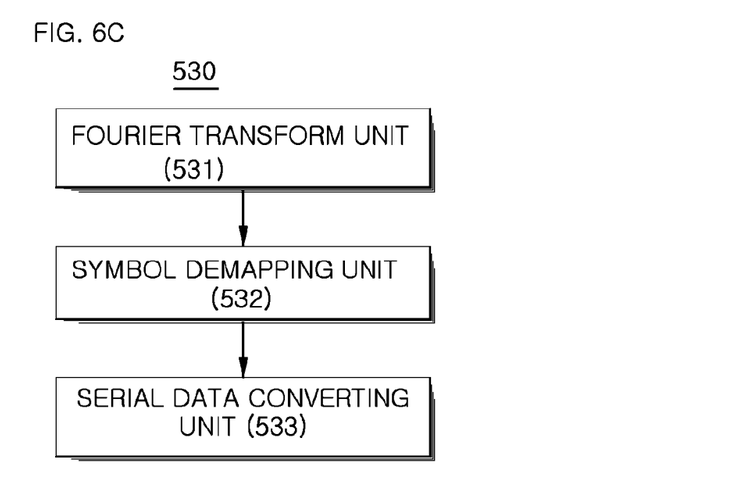

Next, a data reconstitution apparatus will be described. FIG. 5 is a block diagram schematically illustrating a data reconstitution apparatus according to an exemplary embodiment of the present invention. FIGS. 6B and 6C are detailed block diagrams illustrating an internal configuration of the data reconstitution apparatus according to the exemplary embodiment of the present invention.

Referring to FIG. 5, the data reconstitution apparatus 500 includes a data demodulating unit 510, a second data reconstituting unit 520, a first data reconstituting unit 530, a second power source unit 540, and a second main control unit 550. The data reconstitution apparatus 500 is an apparatus that separates and reconstitutes data. The data reconstitution apparatus 500 may be configured to interwork with the data transmission apparatus 100 of FIG. 1. In this case, the data reconstitution apparatus 500 may be implemented with a CE-OFDM receiver.

The data demodulating unit 510 functions to extract second data from combined data in which first data and the second data are combined, primarily digital-demodulate the extracted second data in accordance with a predefined first demodulation scheme, and secondarily digital-demodulate the combined data, from which the second data is extracted, in accordance with a predefined second demodulation scheme. When it is assumed that the data reconstitution apparatus 500 receives a signal transmitted by the data transmission apparatus 100 of FIG. 1, the first data represents the modulated first input data of FIG. 1, and the second data represents the modulated second input data of FIG. 1.

The data demodulating unit 510 uses a demodulation scheme different from a multi-carrier demodulation scheme as the first demodulation scheme or the second demodulation scheme. The first demodulation scheme and the second demodulation scheme may be the same as or different from each other. In this embodiment, a phase demodulation is used as the first demodulation scheme, and an angle modulation is used as the second demodulation scheme. In this embodiment, an OFDM demodulation is used as the multi-carrier demodulation scheme. A phase demodulation, an amplitude demodulation, and a combination of the phase demodulation and the amplitude demodulation may be used as the demodulation scheme different from the multi-carrier demodulation scheme.

The data demodulating unit 510 performs the digital demodulation in accordance with the first demodulation scheme, based on phase information of symbols inserted into a DC component of a signal containing the combined data.

When the data demodulating unit 510 performs the digital demodulation in accordance with the second demodulation scheme, the data demodulating unit 510 uses first combined data, which is obtained by subtracting the phase value of the second data, or second combined data, which is obtained by adding the phase value of the second data, as the combined data from which the second data is extracted. When the combined data is combined data obtained by adding the phase value of the first data and the phase value of the second data, or combined data obtained by subtracting the phase value of the first data from the phase value of the second data, the data demodulating unit 510 uses the first combined data when the data demodulating unit 510 performs the digital demodulation in accordance with the second demodulation scheme. On the other hand, when the combined data is combined data obtained by subtracting the phase value of the second data from the phase value of the first data, the data demodulating unit 510 uses the second combined data when the data demodulating unit 510 performs the digital demodulation in accordance with the second demodulation scheme.

The second data reconstituting unit 520 functions to reconstitute the second data by symbol-mapping the digital-demodulated second data. The second data reconstituting unit 520 reconstitutes the second data into original data. That is, the second data reconstituting unit 520 reconstitutes the second data into data that is prior to data modulation.

The first data reconstituting unit 530 functions to reconstitute the first data by digital-demodulating the digital-demodulated combined data again in accordance with a multi-carrier demodulation scheme. The first data reconstituting unit 530 reconstitutes the first data into original data.

The second power source unit 540 functions to supply power to the respective units constituting the data reconstitution apparatus 500.

The second main control unit 550 functions to control the overall operations of the respective units constituting the data reconstitution apparatus 500.

As illustrated in FIG. 6B, the data reconstitution apparatus 500 may further include a data receiving unit 560. The data receiving unit 560 may interwork with the data transmission apparatus (for example, reference numeral 100 in FIG. 1) that combines the first data with the second data, upon secondary data modulation. In this case, the data receiving unit 560 functions to receive the combined data from the data transmission apparatus. When the data transmission apparatus is configured with the structure indicated by reference numeral 100 of FIG. 1, the data transmission apparatus includes the first data modulating unit, the second symbol mapping unit, the second data modulating unit, and the data transmitting unit. The first data modulating unit includes a first symbol mapping unit that symbol-maps the first data. The first data modulating unit generates the first modulated data by digital-modulating the first data in accordance with a multi-carrier modulation scheme. The second symbol mapping unit generates the second mapping data by symbol-mapping the second data inserted after the input of the first data. The second data modulating unit combines the first modulated data with the second mapping data and generates the combined data by digital-modulating the combined data again in accordance with a modulation scheme (e.g., an angle modulation) different from the multi-carrier modulation scheme. The data transmitting unit transmits the combined data to the data reconstitution apparatus 500.

As illustrated in FIG. 6B, the data reconstitution apparatus 500 may further include a parallel data converting unit 570. When the digital-demodulated combined data is serially input, the parallel data converting unit 570 functions to convert the serial data into parallel data. In this case, as illustrated in FIG. 6C, the first data reconstituting unit 530 may include a Fourier Transform (FT) unit 531, a symbol demapping unit 532, and a serial data converting unit 533. The FT unit 531 FT-processes the parallel data and generates FT-processed data. The symbol demapping unit 532 symbol-demaps the FT-processed data and generates symbol demapping data. The serial data converting unit 533 reconstitutes the first data by converting the symbol demapping data into serial data.

Figure 7:
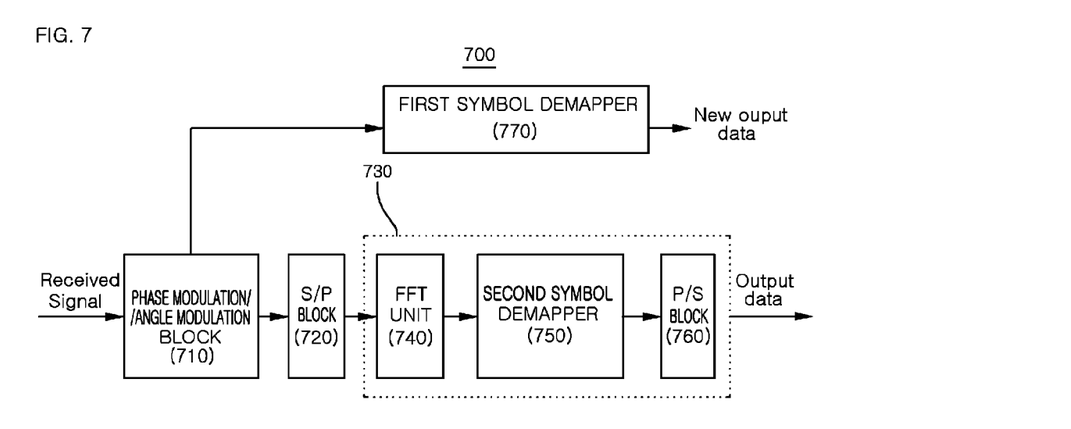
FIG. 7 is an exemplary diagram illustrating a data reconstitution apparatus according to an exemplary embodiment of the present invention.

Next, an exemplary embodiment of the data reconstitution apparatus 600 will be described. FIG. 7 is an exemplary diagram of the data reconstitution apparatus according to an exemplary embodiment of the present invention. FIG. 7 exemplarily illustrates a case where the data reconstitution apparatus 600 is implemented with a CE-OFDM receiver 700.

A phase demodulation/angle demodulation block 710 demodulates phase information of a DC component from a received CE-OFDM signal. Thereafter, the phase demodulation/angle demodulation block 710 angle-demodulates the CE-OFDM signal. The phase demodulation/angle demodulation block 710 is configured to perform the function of the data demodulating unit 510 of FIG. 5.

The phase demodulation/angle demodulation block 710 obtains a phase of the DC component from the received input signal and then performs a phase demodulation. For example, when it is assumed that information bit of 001 is modulated by an 8PSK scheme in a transmitting side, a DC component of a received signal, i.e., an average value of the received signal, is $$\frac{1}{\sqrt{2}} + j * \frac{1}{\sqrt{2}}$$

and a phase of the DC component is 45 degrees. The phase demodulation/angle demodulation block 710 demodulates the shifted phase value of 45 degrees into 001. The phase demodulation/angle demodulation block 710 performs an angle demodulation by adds the shifted phase of the DC component to the received signal or subtracting the shifted phase of the DC component from the received signal. For example, when the transmitted signal is θ(new)+[θ(1), θ(2), θ(3), . . . , θ(n], the angle demodulation is performed after the shifted phase θ(new) of the DC component is subtracted from the received signal. In the above assumption, θ(new) is 45 degrees.

When the phase demodulation/angle demodulation block 710 demodulates the phase information of the DC component, a first symbol demapper 770 symbol-demaps this signal and then reconstitutes new data information bits. The first symbol demapper 770 is configured to perform the function of the second data reconstituting unit 520 of FIG. 5 and uses a BPSK, a QPSK, an 8PSK, or the like upon demapping.

Meanwhile, the phase demodulation/angle demodulation block 710 angle-demodulates the CE-OFDM signal, and the angle-demodulated CE-OFDM signal is converted into a frequency-domain signal through an S/P block 720 and an FFT unit 740. Thereafter, the FFT output signal is reconstituted into CE-OFDM information bits through a second symbol demapper 750 and a parallel-to-serial (P/S) block 760. In the above, the S/P block 720 S/P-converts an input signal in order to FFT-process the angle-modulated signal. The S/P block 720 is configured to perform the function of the parallel data converting unit 570 of FIG. 6B. The FFT unit 740 converts an input signal into a frequency-domain signal and is configured to perform the function of the FT unit 531 of FIG. 6C. The second symbol demapper 750 reconstitutes transmission symbols through a symbol demapping and is configured to perform the function of the symbol demapping unit 532 of FIG. 6C. The second symbol demapper 750 uses a QPSK, a 16QAM, or the like upon demapping. The P/S block 760 reconstitutes information bits through a P/S conversion and is configured to perform the function of the serial data converting unit 533. The FFT unit 740, the second symbol demapper 750, and the P/S block 760 may be combined to configure an OFDM demodulator 730. The OFDM demodulator 730 is configured to perform the function of the first data reconstituting unit 530 of FIG. 5.

Figure 8:
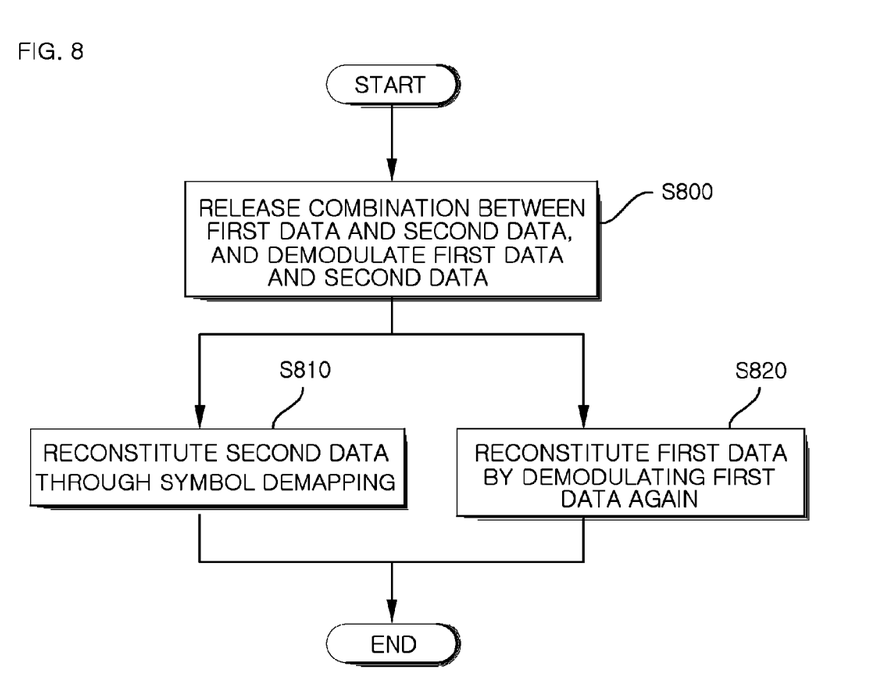
FIG. 8 is a flowchart schematically illustrating a data reconstitution method according to an exemplary embodiment of the present invention.

Next, a data reconstitution method of the data reconstitution apparatus 500 will be described. FIG. 8 is a flowchart schematically illustrating a data reconstitution method according to an exemplary embodiment of the present invention.

First, second data is extracted from combined data in which the first data is combined with the second data, and the extracted second data is primarily digital-demodulated in accordance with a predefined first demodulation scheme, and the combined data from which the second data is extracted is secondarily digital-demodulated in accordance with a predefined second demodulation scheme (a data demodulating step (S800)).

In the data demodulating step (S800), a demodulation scheme different from a multi-carrier demodulation scheme is used as the first demodulation scheme or the second demodulation scheme.

In the data demodulating step (S800), the digital demodulation is performed in accordance with the first demodulation scheme, based on phase information of symbols inserted into a DC component of a signal containing the combined data. Alternatively, in the data demodulating step (S800), when the digital demodulation is performed in accordance with the second demodulation scheme, first combined data obtained by subtracting a phase value of the second data, or second combined data obtained by adding the phase value of the second data is used as the combined data from which the second data is extracted.

After the data demodulating step (S800), the second data is reconstituted by symbol-demapping the digital-demodulated second data (a second data reconstituting step (S810)).

After the second data reconstituting step (S810), the first data is reconstituted by digital-demodulating the digital-demodulated combined data again in accordance with a multi-carrier demodulation scheme (a first data reconstituting step (S820)). In this embodiment, the first data reconstituting step (S820) and the second data reconstituting step (S810) may be performed at the same time.

In this embodiment, a data receiving step may be further performed before the data demodulating step (S800). The data receiving step interworks with the data transmission apparatus combining the first data with the second data, upon the secondary data modulation, and the combined data is received from the data transmission apparatus.

Meanwhile, in this embodiment, a parallel data converting step may be further performed between the data demodulating step (S800) and the first data reconstituting step (S820). In the parallel data reconstituting step, when the digital-demodulated combined data is serially input, the serial input data is converted into parallel data. In this case, the first data reconstituting step (S820) may include an FT step, a symbol demapping step, and a serial data converting step. In the FT step, the parallel data is FT-processed to generate FT-processed data. In the symbol demapping step, symbol demapping data is generated by symbol-demapping the FT-processed data. In the serial data converting step, the first data is reconstituted by converting the symbol demapping data into serial data.

The present invention provides an apparatus and a method related to the insertion of additional data in a transmission scheme in which an OFDM modulation and an angle modulation are combined, and is applicable to a CE-OFDM transmitter and a CE-OFDM receiver.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A data transmission apparatus for inserting additional data upon data modulation, the data transmission apparatus comprising:
   a first data modulating unit comprising a first symbol mapping unit configured to symbol-map first input data, wherein the first data modulating unit is configured to generate first modulated data by digital-modulating the first input data in accordance with a multi-carrier modulation scheme;
   a second symbol mapping unit configured to generate second mapping data by symbol-mapping second input data inserted after the input of the first input data;
   a second data modulating unit configured to combine the first modulated data with the second mapping data and generate second modulated data by digital-modulating the combined data again in accordance with a predefined modulation scheme; and
   a data transmitting unit configured to transmit the second modulated data to the exterior,
   wherein, when the second data modulating unit combines the first modulated data with the second mapping data, the second data modulating unit inserts phase information of symbols related to the second mapping data to a DC component of a signal containing the first modulated data.

2. The data transmission apparatus of claim 1, wherein, when the second data modulating unit combines the first modulated data with the second mapping data, the second modulating unit uses any one of a first combination, which adds a phase value of the first modulated data and a phase value of the second mapping data, a second combination, which subtracts the phase value of the second mapping data from the phase value of the first modulated data, and a third combination, which subtracts the phase value of the first modulated data from the phase value of the second mapping data.

3. The data transmission apparatus of claim 1, wherein the second data modulating unit uses a modulation scheme different from the multi-carrier modulation scheme as the predefined modulation scheme.

4. The data transmission apparatus of claim 1, wherein the second symbol mapping unit performs the symbol mapping of the second input data by phase-modulating the second input data.

5. The data transmission apparatus of claim 1, wherein the data transmission apparatus is implemented with a Constant Envelope-Orthogonal Frequency Division Multiplexing (CE-OFDM) transmitter.

6. A data transmission method for inserting additional data upon data modulation, the data transmission method comprising:
   a first data modulating step comprising a first symbol mapping step for symbol-mapping first input data, wherein the first data modulating step generates first modulated data by digital-modulating the first input data in accordance with a multi-carrier modulation scheme;
   a second symbol mapping step for generating second mapping data by symbol-mapping second input data inserted after the input of the first input data
   a second data modulating step for combining the first modulated data with the second mapping data and generating second modulated data by digital-modulating the combined data again in accordance with a predefined modulation scheme; and
   a data transmitting step for transmitting the second modulated data to the exterior,
   wherein, when the first modulated data is combined with the second mapping data in the second data modulating step, phase information of symbols related to the second mapping data is inserted into a DC component of a signal containing the first modulated data.

7. The data transmission method of claim 6, wherein, when the first modulated data is combined with the second mapping data, the second modulating step uses any one of a first combination, which adds a phase value of the first modulated data and a phase value of the second mapping data, a second combination, which subtracts the phase value of the second mapping data from the phase value of the first modulated data, and a third combination, which subtracts the phase value of the first modulated data from the phase value of the second mapping data.

8. A data reconstitution apparatus, comprising:
   a demodulating unit configured to
      extract second data from combined data in which first data was combined with the second data to form the second data and the first data from which the second data is extracted,
      perform digital-demodulation on the extracted second data in accordance with a predefined first demodulation scheme, and
      perform digital-demodulation on the first data from which the second data is extracted, in accordance with a predefined second demodulation scheme;
   a second data reconstituting unit configured to reconstitute the second data by symbol-demapping the digital-demodulated second data; and
   a first data reconstituting unit configured to reconstitute the first data by digital-demodulation of the digital-demodulated first data again in accordance with a multi-carrier demodulation scheme,
   wherein the data demodulating unit performs the first demodulation scheme, based on phase information of symbols inserted into a DC component of a signal containing the combined data.

9. The data reconstitution apparatus of claim 8, wherein the data demodulating unit forms the digital-demodulated first data by subtracting a phase value of the second data from the first data from which the second data is extracted, or by adding the phase value of the second data and the first data from which the second data is extracted, when the digital demodulation is performed in accordance with the second demodulation scheme.

10. The data reconstitution apparatus of claim 8, wherein the data demodulating unit uses a demodulation scheme different from the multi-carrier demodulation scheme as the first demodulation scheme or the second demodulation scheme.

11. The data reconstitution apparatus of claim 8, wherein the data reconstitution apparatus is implemented with a Constant Envelope-Orthogonal Frequency Division Multiplexing (CE-OFDM) receiver.

12. The data reconstitution apparatus of claim 8, further comprising:
   a data receiving unit configured to interwork with a data transmission apparatus combining the first data with the second data upon secondary data modulation, and receive the combined data from the data transmission apparatus.

13. The data reconstitution apparatus of claim 12, wherein the data transmission apparatus comprises:
   a first data modulating unit comprising a first symbol mapping unit configured to symbol-mapping the first data, wherein the first data modulating unit is configured generate first modulated data by digital-modulating the first data in accordance with a multi-carrier modulation scheme;
   a second symbol mapping unit configured to generate second mapping data by symbol-mapping the second data inserted after the input of the first data;
   a second data modulating unit configured to combine the first modulated data with the second mapping data, and generate the combined data by digital-modulating the combined data again in accordance with a modulation scheme different from the multi-carrier modulation scheme; and
   a data transmitting unit configured to transmit the combined data to the data reconstitution apparatus.

14. A data reconstitution method, comprising:
   a data demodulating step for
      extracting second data from combined data in which first data was combined with the second data to form the second data and the first data from which the second data is extracted,
      digital-demodulating the extracted second data in accordance with a predefined first demodulation scheme, and
      digital-demodulating the first data from which the second data is extracted, in accordance with a predefined second demodulation scheme;
   a second data reconstituting step for reconstituting the second data by symbol-demapping the digital-demodulated second data; and
   a first data reconstituting step for reconstituting the first data by digital-demodulating the digital-demodulated first data again in accordance with a multi-carrier demodulation scheme,
   wherein the data demodulating step performs the first demodulation scheme, based on phase information of symbols inserted into a DC component of a signal containing the combined data.

15. The data reconstitution method of claim 14, wherein the data demodulating step forms the digital-demodulated first data by subtracting a phase value of the second data from the first data from which the second data is extracted, or by adding the phase value of the second data and the first data from which the second data is extracted, when the digital demodulation is performed in accordance with the second demodulation scheme.

16. The data reconstitution method of claim 14, wherein the data demodulating step uses a demodulation scheme different from the multi-carrier demodulation scheme as the first demodulation scheme or the second demodulation scheme.

17. The data reconstitution method of claim 14, further comprising:
   a data receiving step for interworking with a data transmission apparatus combining the first data with the second data upon secondary data modulation, and receiving the combined data from the data transmission apparatus.

* * * * *